(12) United States Patent
Ranka

(10) Patent No.: US 8,859,649 B2
(45) Date of Patent: Oct. 14, 2014

(54) ASPHALT COMPOSITIONS INCLUDING A DISPERION OF MICROGELS DIPERSED IN AN OIL

(75) Inventor: Ajay Ranka, Gujarat (IN)

(73) Assignee: Zydex Industries, Gujarat (IN)

( * ) Notice: Subject to any disclaimer, the term of this patent is extended or adjusted under 35 U.S.C. 154(b) by 630 days.

(21) Appl. No.: 12/969,008

(22) Filed: Dec. 15, 2010

(65) Prior Publication Data

US 2012/0022182 A1    Jan. 26, 2012

(30) Foreign Application Priority Data

Jul. 26, 2010    (IN) .......................... 2120/MUM/2010

(51) Int. Cl.
| | | |
|---|---|---|
| C08F 112/08 | (2006.01) | |
| C08F 112/14 | (2006.01) | |
| C09K 21/08 | (2006.01) | |
| C08L 51/00 | (2006.01) | |
| C08L 95/00 | (2006.01) | |
| C08J 3/075 | (2006.01) | |
| C08L 33/00 | (2006.01) | |
| C08K 5/5419 | (2006.01) | |
| C08K 5/544 | (2006.01) | |
| C08K 5/01 | (2006.01) | |

(52) U.S. Cl.
CPC ................. C08J 3/075 (2013.01); *C08L 33/00* (2013.01); C08L 95/00 (2013.01); *C08K 5/5419* (2013.01); *C08L 2555/52* (2013.01); *C08J 2333/00* (2013.01); *C08K 5/544* (2013.01); *C08K 5/01* (2013.01); *C08L 2555/24* (2013.01); *C08L 2555/40* (2013.01)
USPC ............... 524/59; 524/60; 524/521; 524/515; 523/351; 525/241; 525/233

(58) Field of Classification Search
USPC ...................... 524/59, 60, 521, 515; 523/351; 525/333, 241, 233
See application file for complete search history.

(56) References Cited

U.S. PATENT DOCUMENTS

| 5,928,418 | A | * | 7/1999 | Tamaki et al. ................ 106/277 |
| 7,297,204 | B2 | | 11/2007 | Crews et al. |
| 2008/0194738 | A1 | * | 8/2008 | Crews et al. .................... 524/60 |
| 2010/0159761 | A1 | * | 6/2010 | Ranka et al. .................... 442/59 |

FOREIGN PATENT DOCUMENTS

| GB | 2448088 | * 10/2006 |
| WO | WO 2005/100479 | * 10/2005 |

OTHER PUBLICATIONS

Prowell, B. D.; "*Warm Mix Asphalt: Best Practices*;" NAPA 53$^{rd}$ Annual Meeting; dated Mar. 24, 2008; retrieved on Jul. 2, 2013 from <http://www.warmmix.org/submissions/73__20080324__Warm-MixAsphaltBestPractices__NAPA2008.pdf>.

* cited by examiner

*Primary Examiner* — James J Seidleck
*Assistant Examiner* — Deve E Valdez
(74) *Attorney, Agent, or Firm* — Nelson Mullins Riley & Scarborough, LLP

(57) ABSTRACT

The present invention is related to dispersion compositions and asphalt compositions including the dispersion compositions. The dispersion compositions include a microgels dispersed in a continuous oil phase. The dispersed microgels include at least one water swollen/swellable polymer, water soluble polymer, or combination thereof. The asphalt compositions include bitumen, aggregate, and a dispersion composition having a microgels dispersed in oil. The dispersed microgels include at least one water swollen/swellable polymer, water soluble polymer, or combination thereof.

30 Claims, No Drawings

ASPHALT COMPOSITIONS INCLUDING A DISPERION OF MICROGELS DIPERSED IN AN OIL

FIELD OF INVENTION

The present invention relates generally to dispersion compositions and asphalt compositions including the dispersion compositions. The dispersion compositions include microgels dispersed in a continuous oil phase. The dispersed microgels include at least one water swollen/swellable polymer, water soluble polymer, or a combination thereof.

BACKGROUND OF THE INVENTION

It is known in the art to heat aggregates to 150-170° C. to remove water and mix with hot bitumen (asphalt) at 135-150° C. in the mixing chambers of a drum mix plant or a pug mill batch mix plant or a dual mixer. Additives can be added to the aggregate or bitumen to improve bonding and various physical performance parameters of the final Hot Mix Asphalt (HMA).

The prepared HMA is compacted for surface paving at around 120-135° C. For the past two decades, many technologies have evolved to prepare the asphalt/bitumen mix at lower temperatures. For instance, U.S. Pat. No. 7,297,204 is directed to mixing at a lower temperature and to ensure the workability (flow) and compact-ability at a reduced temperature (e.g., 15-35° C. lower than customary) at the paving stage.

Additional efforts have been tried to expand the bitumen by water injection of 1-4% on the bitumen weight, (24 Mar. 2008, Warm Mix Asphalt: Best Practices, NAPA 53$^{rd}$ Annual Meeting—Brian D. Prowell), above 100° C. Addition of water containing zeolite or fillers and water-in-oil emulsion in collar section in the mixing zone are also known in the art.

However, the water injection or zeolite or filler containing water has a disadvantage that the stability of foamed bitumen is poor. In particular, the formed bubbles are large and break easily. As a result, expansion of the bitumen surface and its stabilization during mechanical mixing is very poor resulting in only marginal improvement in coating and workability compared to normal hot mix. Furthermore, it has been noted that the presence of water results in lower compressive strength and poor tensile strength ratio (TSR) for Marshall Mix Design or Super Pave Mix Design.

Waxes are known to be added to improve lubrication effect for improved workability at lower temperatures. Further, combination of emulsifiers and additives has been added to improve wetting & lubrication to achieve the objective of 15-35° C. lower temperature Asphalt mix preparation and compaction.

However, the addition of waxes and chemical additives like surfactants for improving wetting and processability with compaction at lower temperatures also lowers the tensile strength and undesirably increases rutting phenomenon.

The lower temperature of mixing results in lowering the oxidation of bitumen during processing and storage. The lowering of the oxidation of bitumen results in less hardening of bitumen and ultimately results in undesirably softer pavements. As such, the concerns of rutting and deformation still need to be addressed in immediate use when open to traffic.

Also, during snow fall in winter months, salt mixtures of sodium chloride, magnesium chloride, or calcium chloride are sprinkled on asphalt pavements. These salts in wet condition cause significant damage to asphalt pavements.

As such, there remains a need for a way to reduce coating/wetting time of HMA at a lower temperature at reduced effort (resistance to mixing) to prepare "WARM MIX ASPHALT" (WMA) which will have high strength, improved stiffness, reduced moisture distress and improved stripping resistance in water, particularly salt water. Additionally, there remains a need to improve the processability or workability and improve compaction at lower temperatures (e.g., by 15-25° C. lower than standard or industry recognized compaction temperatures). Further, there remains a need to improve the strength of WMA and resistance to moisture distress.

SUMMARY OF THE INVENTION

The present invention satisfies at least some of the aforementioned needs by providing a dispersion comprising microgels dispersed in an oil, in which the microgels comprise at least one water swollen/swellable polymer, water soluble polymer, or combination thereof. In certain embodiments, the microgels dispersed in oil comprises an aqueous solution while in other embodiments the dispersed microgels comprise a swollen polymer emulsified with a solvent (e.g., oil) and an emulsifying agent.

In one aspect, the microgels in oil dispersions can be incorporated into an asphalt composition. For instance, the asphalt compositions according to embodiments of the present invention can include bitumen, aggregate, and a dispersion comprising microgels dispersed in an oil, in which the microgels include at least one water swollen/swellable polymer, water soluble polymer, or combination thereof.

In another aspect, the present invention provides a process for the preparation of an asphalt composition. In certain embodiments, the process includes adding additives to a binder to form an additive-binder. Bitumen is heated and mixed with the additive-binder to obtain a bitumen-binder. A microgels in oil dispersion according to embodiments of the present invention can be added to the bitumen-binder to form a microgels dispersion containing bitumen mixture. The microgels dispersion containing bitumen mixture is mixed with aggregate at a temperature from 90° C. to 170° C. to form an asphalt composition.

DETAILED DESCRIPTION OF THE INVENTION

The present invention now will be described more fully hereinafter. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present invention generally provides a dispersion comprising microgels dispersed in an oil, in which the microgels comprise at least one water swollen/swellable polymer, water soluble polymer, or combination thereof. In certain embodiments, the microgels dispersed in oil comprises an aqueous solution while in other embodiments the dispersed microgels comprise a swollen polymer emulsified with a solvent (e.g., oil) and an emulsifying agent. Although desiring not to be held to the following explanation, it is believed that the incorporation of a water swollen/swellable polymer, water soluble polymer, or combination thereof (in uncrosslinked or crosslinked form) can support an expanding vapor or steam bubble as the temperature is taken beyond 90° C. That is, the water swollen/swellable polymer and/or water soluble polymer imparts an increased stability to expanded bitumen mixed with the microgels in oil dispersions according to embodiments of the present invention at high temperatures and high shear conditions. As such, embodiments according to the present invention improve the water resistance by capturing the water loving asphaltenes by the expanding microgels and then collapsing it and effectively locking the water loving asphaltenes in a hard polymer domain surrounded by very hydrophobic maltenes.

Additionally, the present invention provides a bituminous/asphalt composition containing bitumen, mineral aggregates, optional additives, and microgels in oil dispersions according to embodiments of the present invention. Preferably, the preparation of these mixes is above 90° C. (e.g., 90-200° C.). In certain embodiments, the microgels dispersion should be added to bitumen just prior to the mixing with aggregate and additives to prepare the mix. As noted previously, the water in the microgels evaporates and causes expansion of bitumen at the mixing temperature and helps to improve the wetting, coating and ease of processing of the hot mix. According to embodiments of the present invention, the coating and wetting by bitumen modified with a microgels in oil dispersion according to embodiments of the present invention is improved under traditional hot mixing conditions for the preparation of WMA. Additionally, embodiments of the present invention provide an improvement in the processability/workability and improved compaction at lower temperature (e.g., 15-25° C. lower than traditionally recognized compaction temperatures). Beneficially, embodiments of the present invention also provide an improvement in the strength of WMA and resistance to moisture distress. In certain embodiments the present invention provides compositions which exhibit improved resistance to the effect of moisture distress with salt water conditioning.

Moreover, embodiments of the present invention provide compositions which exhibit improved strength and resistance to moisture distress. In certain embodiments, the invention further provides compositions which are easily mixable at temperatures 15-35° C. lower than conventionally mixed and are easy to flow and compact at 15-25° C. lower than conventional Hot Mix Asphalt.

The "Bitumen's" and "Modified Bitumens" which are used herein, are those which exhibit rheological properties that are appropriate for paving application under specific climatic condition such as those which conform to the Strategic Highway Research Program (SHRP)) pavement binder specification. The bitumen component may be naturally occurring bitumens (such as Trimidad Lake Asphalt and the like), naturally occurring bituminous materials such as gilsonite and gilsonite derivatives, or it can be produced by crude oil or petroleum pitches (such as asphalt) produced during cracking process and coal tar or blends of bituminous materials. The bitumen may also conform to specification of viscosity graded and/or penetration graded bitumens.

Additives which are traditionally added to bitumen to produce a modified bitumen meeting performance-grade standards (such as SHRP) are suitable for use in certain embodiments according to the present invention. Such additives include, but are not limited to, natural rubbers, synthetic rubbers, plastomers, thermoplastic resins, thermosetting resins, elastomers, and combinations thereof. Examples of these additives include styrene-butadiene-styrene (SBS), styrene-butadiene rubber (SBR), poly-isoprene, polybutylenes, butadiene-styrene rubbers, vinyl polymers, ethylene vinyl acetate, ethylene vinyl acetate derivatives, and the like. Bitumens used in processes according to embodiments of the present invention can also contain recycled crumb rubber from recycled tires. In certain embodiments, the modified bitumen can contain at least one member selected from the group consisting of sulfur, sulfur-containing crosslinkers, acid modifiers such as tall oil acids, tall oil pitches, and phosphoric acid derivatives and combinations thereof. It is well within the ability of a skilled artisan to produce modified bitumen containing the noted additives.

Where desired, additional additives traditionally employed in the production of bitumen include styrene-butadiene-rubber latex, polyisoprene latex, salts, and the like can be included in embodiments according to the present invention. Such additives also include but are not limited to acid modifiers such as poly-phosphoric acid, crude and distilled tall oil acids and tall oil pitches, and derivatives thereof, and wax modifiers such as Montan wax, beeswax, and Fisher-Tropsch waxes, etc.

In certain embodiments, anti-stripping additives like Lime or Hydrated Lime can be used either as powder mixed with aggregates or hydrated lime mixed with water a further mixed with aggregate to marinate at room temperature (e.g., for 10 to 30 hours, particularly 24 hrs).

According to embodiments of the present invention, anti-stripping additives which are bitumen soluble/dispersible such as organic amine or quaternary compounds, and silanes having a boiling point above 100° C. can be used as anti-stripping additives in conjunction with microgels dispersions according to embodiments of the present invention and added to bitumen. The following examples are given for illustrative purposes only as useful compounds according to certain embodiments of the present invention. The following compounds, however, are not an exhaustive list of all useful compounds. That is, the following list of compounds is not limiting and similar compounds within a generic category meeting the 100° C. boiling point criteria can be suitable. For exemplary purposes, compounds such as an organic amine like di-methyl octa decyl amine, poly alkylene poly amines, fatty amido amines derived from $C_{12}$-$C_{24}$ fatty acids, ethoxylated $C_{12}$-$C_{24}$ monoalkyl amines, etc, quaternary compounds like tri-methyl octa decyl ammonium chloride, di-methyl ethoxy poly 12 hydroxy stearate ammonium di-methyl sulfate salt, etc, silanes such as tri-methoxy propyl silyl octa decyl ammonium chloride, di-methoxy, hydroxy ethoxy propyl silyl octa decyl ammonium chloride, etc. The choice and use of these additives or others does not limit the spirit & scope of this invention.

In certain preferred embodiments, the anti-stripping additive includes at least one cationic organosilicon compound to improve adhesion of the bitumen to aggregate. The cationic organosilicon compound is preferably present ranging from 0.001 to 5% wt by weight of the bitumen, more preferably from 0.01 to 3% wt or from 0.1% to 3% wt by weight of the bitumen, most preferably from 0.1% to 2% wt by weight of the bitumen. The cationic organosilicon compounds can be added to the bitumen as a preferred method prior to mixing with the aggregate, but the addition of the cationic organosilicon compounds can be added at the time of bitumen-aggregate mixing. Preferably, the at least one cationic organosilicon is selected from the group consisting of:

$$Y_{3-a}Si(R^1_a)R^2N^+R^3R^4R^5X^-,$$

$$Y_{3-a}Si(R^1_a)R^2P^+R^3R^4R^5X^-,$$

$$Y_{3-a}Si(R^1_a)R^2ZX^-; \text{ and mixtures thereof,}$$

wherein in each formula

Y is independently selected from a group consisting of OR, $O(CH_2CH_2O)_nH$, $(CH_3OCH_2CH_2O)$, and $(CH_3CH_2OCH_2CH_2O)$;

a has a value selected from 0, 1 or 2;
n is a value from 1 to 10;
R is a C1-C4 alkyl;
$R^1$ is either methyl or ethyl;
$R^2$ is a C1-C4 alkylene group;
$R^3$, $R^4$ and $R^5$ are each independently selected from a group consisting of C1-C22 alkyl wherein at least one such group has more than 8 C-atoms, —$CH_2C_6H_5$, —$CH_2CH_2OH$, —$CH_2OH$ and —$(CH_2)_yNHC(O)R^6$ wherein y has a value of from 2 to 10 and $R^6$ is a C1-C12 perfluoroalkyl radical;

X is chloride, bromide, fluoride, iodide, acetate or tosylate; and

Z is pyridinium ring of formula $C_5H_5N^+$.

As noted above, one aspect of the present invention provides a dispersion comprising microgels dispersed in an oil, in which the microgels comprise at least one water swollen/swellable polymer, water soluble polymer, or combination thereof. In certain embodiments, the microgels dispersed in oil comprise an aqueous solution while in other embodiments the dispersed microgels comprise a swollen polymer emulsified with a solvent (e.g., oil) and an emulsifying agent. The microgels in oil dispersions can be added to bitumen and mixed. After adding and mixing a microgels in oil dispersion according to embodiments of the present invention with bitumen, in certain embodiments the resulting mixture comprises from about 0.01% to 5%, preferably from 0.1 to 2% and most preferably 0.25 to 1% wt of microgels based on the weight of bitumen. The microgels comprise at least one water swollen/swellable polymer, water soluble polymer, or combination thereof. As described previously, the microgels are provided in the form of dispersion. That is, the microgels is dispersed in an oil solvent (anionic, amphoteric, nonionic or cationic types microgels and combinations thereof).

The microgels according to certain embodiments of the present invention can be produced by a water-in-oil reverse phase polymerization process by polymerizing water soluble monomers. The gels can also be produced by emulsifying or dispersing water containing polymer solutions and gels in a solvent oil in the presence of an emulsifier under a high shear mixing condition.

According to certain embodiments, the dispersed microgels can be finely divided polymer particles containing water and are stable at customary storage conditions, such as room temperature for up to 6 months or 12 months (for example). Preferably, the particle size of these water swollen polymer particles can be from 0.01 micron to 100 micron, or from 0.2 to 20 microns, and most preferably from 0.5 to 5 microns. According to certain embodiments, the water content in the polymer phase can be from 5% to 98% by weight of the microgels. Preferably it can be from 15-90% by weight of the microgels and most preferably from 30-80% by weight of the aqueous phase or microgels.

Monomers and combinations thereof which are useful according to certain embodiments of the present invention to be used for reverse phase polymerization preferably have water solubility of 5% and above (e.g., 5%-100%, 30%-100%, and 50%-100%, etc.). Suitable monomers can be anionic, cationic, nonionic, or amphoteric in nature when solubilized in water. Exemplary monomers include but not limited to ethylenically unsaturated amides such as acrylamide, methacrylamide and fumaramide, their N-substituted derivatives such as 2-acrylamide-2-methylpropane sulfonic acid (AMPS), N-(dimethylamino-methyl)acrylamide as well as N-(trimethylammoniummethyl)acrylamide chloride and N-(trimethylammoniumpropyl)methacrylamide chloride, ethylenically unsaturated carboxylic acids such as acrylic acid, methacrylic acid, itaconic and fumaric acid, ethylenically unsaturated quaternary ammonium compounds such as vinylbenzyl trimethyl ammonium chloride, sulfoalkyl esters of unsaturated carboxylic acids such as 2-sulfoethyl methacrylate, aminoalkyl, esters of unsaturated carboxylic acids such as 2-amino-ethyl methacrylate and 2-(N,N-dimethylamino) ethyl methacrylate as well as the quaternized derivatives thereof such as acryloylethyl trimethyl ammonium chloride, vinyl amines such as vinyl pyridine and vinyl morpholine, diallyl amines and diallyl ammonium compounds such as diallyl dimethyl ammonium chloride, vinyl heterocyclic amides such as vinyl pyrrolidone, vinylaryl sulfonates such as vinylbenzyl sulfonate as well as the salts of the foregoing monomers.

In certain embodiments, crosslinking agents can also be included. Crosslinking agents which can be employed include, but are not limited to, di, tri, multi-functional vinyl monomers and combinations thereof which can undergo free radical polymerization. For example, N—N methylene bis-acrylamide, poly ethylene glycol 400 di-acrylate, tri-methylol propane tri-acrylate, etc., can be used according to certain embodiments of the present invention. Additionally, additive agents can be di-functional, tri-functional or multi-functional and preferably can undergo condensation reaction with the functional groups on the polymer chain are also useful according to embodiments of the present invention. In certain embodiments, these additives for crosslinking can be water soluble or oil soluble. The polymer microgels as prepared can be useful as such or subjected to post-treatment and reaction to crosslink them or functionalize them to be useful for particular uses according to embodiments of the present invention.

The aqueous phase (e.g., monomer phase) when dispersed in solvent oil with the help of emulsifiers can be subjected to polymerization using free radical initiation by initiators or radiation to generate free radicals and polymerize under inert atmosphere. Preferably, this free radical initiator is employed in amounts from about 0.01 to 0.1% weight of initiator based on the monomer content. Exemplary polymerization initiators include inorganic persulfates such as potassium persulfate, ammonium persulfate, sodium persulfate, azo catalysts such as azobis isobutyronitrile and dimethyl azoisobutyrate, organic peroxygen compounds such as benzyl peroxide, t-butyl peroxide, etc. In addition to the afore-mentioned ingredients, the reverse phase polymerization can use chain transfer agents, chelating agents, buffers, salts, reducing agents, and the like.

The oil solvent phase used in preparation of these emulsions according to embodiments of the present invention can be comprised of an inert hydrophobic liquid. The hydrophobic liquid can comprise between 5 to 90% by weight of the dispersion. Preferably the hydrophobic liquid (e.g., oil) can comprise between 5-40% by weight of the dispersion and more preferably between 20-30% by weight of the dispersion.

The solvent oil selected in preparing the dispersions/emulsions according to embodiments of the present invention can be selected from liquid hydrocarbons or substituted hydrocarbon. A preferred group of organic liquids include aliphatic hydrocarbon liquids which include blends of aromatic and aliphatic hydrocarbon compounds. Thus, such organic hydrocarbon liquids as benzene, xylene, toluene, mineral oils, kerosene, naphtha, transformer oils and in some instances petroleum and their blends can be used according to certain embodiments of the present invention. Solvents (e.g., oil) according to certain embodiments can have less than 10% water solubility, but preferably have less than 5% water solubility (e.g., 0 to 5% water solubility). Of the foregoing organic liquids, the hydrocarbons are generally more preferred while aliphatic hydrocarbons are most preferred.

In certain embodiments of the present invention, conventional water-in-oil emulsifying agents can be used such as sorbitan mono stearate, sorbitan mono oleate. In certain embodiments, emulsifying agents within the range of 1-10, preferably 2-8, most preferably 3-6 of the so-called low hydrophilic-hydrophobic balance (HLB) are suitable. The emulsifiers useful in this invention are preferably those types listed in Atlas HLB Surfactant Selector or McCatcheon's hand book of emulsifiers. In certain embodiments, the emulsifiers suitable are those capable of emulsifying the aqueous phase containing water soluble monomers in the organic liquid and keeping the dispersion stable during polymerization and during storage. Additionally, a class of polymeric emulsifiers known in the art which are copolymers of hydrophilic and hydrophobic monomers or further modified to impart emulsification and stabilization properties to the water-in-oil dispersion can also be used to prepare dispersions according to embodiments of the present invention with or without other emulsifiers.

According to certain embodiments of the present invention, vinyl hydrophobic monomers including for example, but not limited to, long chain acrylates C12-C22 can also be added to the dispersion after the emulsification and allowed to react at the particle surface to improve the stability of the dispersions. Preferably, hydrophobic vinyl functional monomers with less than 1% solubility in water are suitable. Furthermore, the vinyl functional monomers include acrylates or methacrylates, but are not limited thereto.

As previously referenced, the present invention provides a composition comprising a dispersion having a microgels dispersed in a continuous oil phase, in which the microgels comprise at least one water swollen/swellable polymer, water soluble polymer, or combination thereof. In certain embodiments, the microgels dispersed in the oil phase comprises an aqueous solution or swollen polymer emulsified with a solvent oil and an emulsifying agent. In certain embodiments, the dispersed microgels comprise a cross-linked (e.g., cross-linked polymeric material) microgels while in other embodiments the microgels comprise an uncross-linked microgels.

In certain preferred embodiments the microgels comprise a water content from 5% to 98% by weight on the weight of the microgels. Additionally, in certain embodiments the dispersion includes a water swollen/swellable polymer and/or water soluble polymer which comprises a reverse phase polymerization reaction product of an aqueous monomer phase with a solvent oil and an emulsifier. In certain embodiments, the dispersion can include a reaction additive to impart cross-linking or chain extensions to promote formation of a cross-linked microgels dispersion in oil. In one embodiment, the aqueous monomer phase includes a multifunctional monomer capable of forming a cross-linked water swollen or water swellable microgels. The dispersed microgels, according to embodiments, comprises an aqueous solution or swollen polymer emulsified with a solvent oil and an emulsifying agent. In certain embodiments, the emulsifying agent is a combination of an emulsifier and a vinyl functional oil soluble monomer.

In another aspect, the present invention provides asphalt compositions including bitumen, aggregate, optionally additives as set forth herein, and a dispersion comprising microgels dispersed in an oil, in which the microgels include at least one water swollen/swellable polymer, water soluble polymer, or combination thereof. Asphalt compositions, according to certain embodiments of the present invention, include from 80% wt to 98% wt of aggregate on the weight of the asphalt composition, from 2% wt to 20% wt of bitumen on the weight of the asphalt composition, and from 0.01% wt to 5% wt of the microgels on the weight of bitumen. In certain embodiments, the asphalt compositions can include from 85% wt to 95% wt or from 90% wt to 95% wt on the weight of the asphalt composition. In certain embodiments, the asphalt compositions can include from 5% wt to 18% wt or from 8% wt to 15% wt of bitumen on the weight of the asphalt composition. In certain embodiments, the asphalt compositions can include from 0.05% wt to 3% wt or 0.1% wt to 2% wt of the microgels on the weight of the bitumen. In other embodiments, the asphalt compositions can include from 0.01% wt to 3% wt or 0.01% wt to 1% wt of the microgels on the weight of the bitumen. As described previously, the bitumen can include a variety of additives such as modifiers, extenders, and anti-stripping compounds previously described.

Aggregate used in paving materials and road construction, road rehabilitation, road repair, and road maintenance are derived from natural and synthetic sources. As in any construction process, aggregates are selected for asphalt paving application based on a number of criteria, including physical properties, compatibility with the bitumen to be used in the construction process, availability, and ability to provide a finished pavement that meets the performance specifications of the pavement layer for the traffic projected over the design life of the project. Among the aggregate properties that are key to successful road construction is gradation, which refers to the percent of aggregate particles of a given size. For most load-bearing asphalt pavements, three gradations are common: dense-graded, gap-graded and open-graded. Dense-graded aggregate exhibit the greatest mineral surface area (per unit of aggregate). Open-graded aggregate largely consist of a single, large-sized (e.g. around 0.375 to 1.0 inch) stone with very low levels (typically less than about two percent of the total aggregate) of fines (material less than 0.25 inch) or filler (mineral material less than 0.075 mm). Gap-graded aggregate fall between dense-graded and open-graded classes. Reclaimed asphalt pavement (RAP) material generally reflects the gradation of the pavement from which the reclaimed material was obtained. If the original pavement was a dense-graded mix, the RAP generally will also be dense graded, although the filler content is generally observed to be lower than the design limits of the original aggregate specifications.

Any aggregate which is traditionally employed in the production of bituminous paving compositions is suitable for use in certain embodiments according to the present invention, including dense-graded aggregate, gap-graded aggregate, open-graded aggregate, stone-matrix asphalt, recycled asphalt paving, and mixtures thereof. In certain embodiments, aggregate which is not fully dried can be employed. In such embodiments, for instance, pre-treatment of the aggregate with an anti-stripping agent can be performed. In certain embodiments, pre-treatment of the aggregate with a cationic silane solution has demonstrated excellent anti-stripping performance at similar quantities per tonne of mix instead of using it through a binder. In certain preferred embodiments, the aggregate can be pre-treated with one or more of the cationic organosilicon compounds described herein.

Where used in paving applications, it is preferred that the bituminous compositions of the present invention be prepared and applied to the surface to be paved at a temperature of 15-35° C. lower than the conventionally employed temperature to achieve similar improved physical properties compared to hot mix preparation without the use of microgels dispersion. That is, conventional preparation temperatures are typically above 135° C. (e.g., 135-155° C.), while certain embodiments of the present invention can beneficially be prepared at reduced temperatures relative to these conventional preparation temperatures. In certain embodiments, for instance, the bituminous compositions can be prepared at temperatures below 135° C. (e.g., 135-120° C.), such as 120° C. to 130° C. or 120° C. to 125° C.

Once applied to the surface to be paved, the bituminous compositions according to embodiments of the present invention can be compacted using any of the compaction methods traditionally employed for paving applications. It is preferred that the applied bituminous compositions be compacted to an air void content comparable or lower to hot mix pavement compositions made at 15-25° C. higher temperatures having substantially equivalent aggregate gradation and bitumen content. Certain embodiments of the present invention can beneficially be compacted at a reduced temperature relative to preparations devoid of a dispersion comprising microgels in oil in accordance with embodiments of the present invention. For instance, conventional compaction temperatures range from 120° C. to 130° C. The ability to compact embodiments of the present invention at reduced temperatures relative to the conventional temperatures is beneficially realized with embodiments of the present invention. Certain embodiments of the present invention can, for example, be compacted at a temperature from 105° C. to 115° C.

According to certain embodiments of the present invention, the ability/properties that enable the reduced preparation and compaction temperatures provides several immediately apparent results. For example, a 15° C. to 25° C. reduction in preparation temperature can lead to a 17% to 20% reduction in fuel consumption as well as reducing the production of $CO_2$ per ton of asphalt mix. Additionally, the reduced temperatures can help mitigate the exposure of workers to any volatile organic vapors and odors associated with bitumen. Furthermore, workers during summer months, for example, find it especially difficult to work with hot mixes and the lowering of the preparation and compaction temperatures mitigates the level of heat stress realized by workers.

It is also further preferred that the applied bituminous compositions be compacted to develop load-bearing strength comparable to hot mix pavement compositions made at 15-35° C. higher temperatures and having substantially equivalent aggregate gradation and bitumen content.

Furthermore, embodiments of the present invention are suitable for use in thin lift overlay paving applications. The current thin lift technology using hot-mix bituminous compositions commonly suffers from two chief deficiencies. The hot bituminous compositions tend to cool quickly, making it difficult to spread on the existing pavement surface (at ambient temperatures) that is in need of repair. This rapid cooling of the thin lift of hot bituminous material can also result in relatively poor compaction.

Where desired, the methods and bituminous dispersions according to embodiments of the present invention can be used in in-situ production of bituminous compositions. Such in-situ operations include on-site recycling operations such as hot in-place recycling where an aged, distressed pavement may be heated with a variety of portable heater units, scarified, and re-combined with bituminous material to create a rejuvenated paving composition. The rejuvenated paving composition is immediately extended over the width of the traffic lane and compacted to create a rejuvenated pavement riding surface.

Bituminous compositions according to embodiments of the present invention are preferably maintained in range of 80-150° C. (preferably in range of 90-120° C. during the production and then use in paving application). It would be preferred to maintain the bituminous compositions at these temperatures in closed systems like large stock silos, storage silos, covered transport vehicles and like to ensure the availability at site under these temperature conditions. In yet another aspect, the present invention provides a process for the preparation of an asphalt composition. In certain embodiments, bitumen is heated as described herein and a dispersion according to embodiments of the present invention can be added to the bitumen to form a microgels in oil dispersion containing bitumen mixture. This resulting mixture can be mixed with aggregate at a temperature from 90° C. to 175° C., 90° C. to 135° C., 100° C. to 125° C., or from 105° C. to 120° C. to form the asphalt composition.

In certain embodiments, the process can also include the addition of one or more additives as described herein to the bitumen. The addition of additives can be performed to the bitumen prior to or during heating of the bitumen. According to certain embodiments, the addition of additives is made to a binder to form an additive-binder. The additive-binder can be added to bitumen and mixed. In general, the addition of additives, including an additive-binder, can be performed after, before, or during the heating of the bitumen. In certain embodiments, a microgels in oil dispersion is added to the bitumen or bitumen/additive binder mixture. Preferably, the desired aggregate is added and mixed with the microgels dispersion containing bitumen mixture. However, the addition of the microgels in oil dispersion can be added at any time, including after the addition of aggregate if desired. In certain embodiments the aggregate is provided in a pre-heated state prior to adding into the bitumen. For example, the aggregate can be pre-heated from 90° C.-175° C. prior to mixing with the bitumen. In certain preferred embodiments, a recycled asphalt pavement (RAP) is also mixed with the microgels dispersion containing bitumen mixture. That is RAP and aggregate can both be added and mixed with the bitumen in the same batch.

As referenced above, hydrated lime mixed with water can also be employed. That is, hydrated lime mixed with water can be added to aggregate followed by marinating from 10 to 30 hours or from 20 to 25 hours prior to heating.

In certain preferred embodiments, the process can include a step of adding at least one cationic organosilicon compound. The cationic organosilicon compound is preferably present ranging from 0.001 to 5% wt by weight of the bitumen, more preferably from 0.01 to 3% wt or from 0.1% to 3% wt by weight of the bitumen, most preferably from 0.1% to 2% wt by weight of the bitumen. Preferably, the at least one cationic organosilicon is selected from the group consisting of:

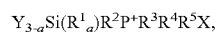

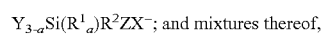

wherein in each formula

Y is independently selected from a group consisting of OR, $O(CH_2CH_2O)_nH$, $(CH_3OCH_2CH_2O)$, and $(CH_3CH_2OCH_2CH_2O)$;

a has a value selected from 0, 1 or 2;

n is a value from 1 to 10;

R is a C1-C4 alkyl;

$R^1$ is either methyl or ethyl;

$R^2$ is a C1-C4 alkylene group;

$R^3$, $R^4$ and $R^5$ are each independently selected from a group consisting of C1-C22 alkyl wherein at least one such group has more than 8 C-atoms, —$CH_2C_6H_5$, —$CH_2CH_2OH$, —CH$_2$OH and —(CH$_2$)$_y$NHC(O)R$^6$ wherein y has a value of from 2 to 10 and R$^6$ is a C1-C12 perfluoroalkyl radical;

X is chloride, bromide, fluoride, iodide, acetate or tosylate; and

Z is pyridinium ring of formula C$_5$H$_5$N$^+$

In general, the mixing can be performed by use of drum mixers, pug mill batch mixers or dual mixers.

The following examples are provided to further illustrate the present invention and are not to be construed as limiting the invention in any manner.

Example 1

136 gm of Acrylic Acid was diluted with 338.2 gm of water and neutralized with 130.0 gm of 25% Ammonia to achieve pH of 7.5. 11.8 gm of Acrylamide was added to the solution. Sodium Salt of di-ethylene tri-amine penta acetic acid (DTPA), N-methylene bis acrylamide of 1.2 gm and 0.126 gm were added respectively and dissolved. This was used as the monomer phase.

Paraffinic solvent boiling point range (205-295) with less than 3% aromatic content was used as solvent oil medium for preparation of water-in-oil dispersion under high shear. 120 gm of oil with 1.0 gm of Sorbitan mono-oleate and 0.3 gm of Azobis isobutyronitrile were, added continuously a phase of emulsifier solution having 50 gm of solvent, quaternary di-methyl sulfate salt of amino poly 12 hydroxy stearate 2 gm, poly ethylene oxide (POE) 7.5 moles of stearyl alcohol, 1.5 gm, POE (5) of Sorbitan mono stearate 1.5 gm, Sorbitan mono stearate 1.5 gm, Sorbitan mono-oleate 1.5 gm and condensate of POE (10) lauryl alcohol with poly 12 hydroxy stearic acid condensate 5.5 gm and monomer phase was also added over 30 min. Both phases were completely added in 30 minutes under high speed stirring to produce a stable dispersion. 10 gm of oil and 40 gm of ceto-stearyl methacrylate were added to prepare the final emulsion and then subjected to polymerization under nitrogen blanket by adding t-butyl hydroperoxide & sodium meta-bi-sulfite at 50-70° C. for 2 hrs.

The product was then filtered to remove coagulum of approximately 0.2 gm.

Example 2

170 gm of acrylamide is dissolved in 426.2 gm of water and mixed with 14.8 gm of di-methyl amino ethyl methacrylate. The pH is adjusted to 7.0 by adding 5.0 gm of 98% sulfuric acid, sodium salt of DTPA and N-methylene bis acrylamide of 1.5 gm & 0.1 gm were added respectively. This was used as the monomer phase.

115 gm of paraffinic solvent as described in Example-1 was mixed with Sorbitan mono-oleate 5 gm and Azo bis isobutyronitrile 0.3 gm. To this, emulsifier phase with 50 gm of solvent oil mixed with 1.1 gm of quaternary di-methyl sulfate salt of amino 12 poly hydroxyl stearate, 1.6 poly ethylene oxide (POE) 5 moles of Sorbitan mono-stearate 3.5 gm of POE (7.5) of stearyl alcohol, 8.5 gm of condensate of POE (10) of Lauryl alcohol & poly 12 hydroxy stearic acid, 5.0 gm of Sorbitan mono-olelate, 2 gm of Sorbitan mono-stearate, and monomer phase were added 30 minutes under high speed stirring to produce a stable dispersion. 20 gm of solvent oil and 20 gm of ceto-stearyl methacrylate were added to the final dispersion and subjected to polymerization under nitrogen blanket by adding t-butyl hydroperoxide and sodium meta-bi-sulfite at 50-70° C. for 2 hrs.

The product was then filtered to remove coagulum of 0.5 gm and used further.

Example 3

184.8 gm of acrylamide was dissolved in 431.2 gm of water. 1.5 gm of sodium salt of DTPA and 0.1 gm of N-methylene bis acrylamide was added to the solution.

115 gm of paraffinic solvent as described in Example-1 was mixed with Sorbitan mono-oleate 5 gm and Azo bis isobutyronitrile 0.3 gm to this emulsifier phase with 50 gm of solvent oil mixed with 1.1 gm of quaternary di-methyl sulfate salt of amino 12 poly hydroxyl stearate, 1.6 poly ethylene oxide (POE) 5 moles of Sorbitan mono-stearate 3.5 gm of POE (7.5) of stearyl alcohol, 8.5 gm of condensate of POE (10) of Lauryl alcohol & poly 12 hydroxy stearic acid, 5.0 gm of Sorbitan mono-olelate, 2 gm of Sorbitan mono-stearate, and monomer phase were added 30 minutes under high speed stirring to produce a stable dispersion. 20 gm of solvent oil and 20 gm of ceto-stearyl methacrylate were added to the final dispersion and subjected to polymerization under nitrogen blanket by adding t-butyl hydroperoxide and sodium meta-bi-sulfite at 50-70° C. for 2 hrs.

The product was then filtered to remove coagulum of 1.2 gm and used further.

Example 4

150 gm of acrylamide was dissolved in 150 gm of D.M. water. 12.9 gm of di-methyl amino ethyl methacrylate and 3.65 gm of 98% sulfuric acid was added and pH was adjusted to 6.5-7.0. 1.375 gm of sodium salt of DTPA was added to prepare the monomer phase.

105 gm of paraffinic solvent as described in Example-1 was mixed with 4.5 gm Sorbitan mono stearate, 5.4 gm of Sorbitan mono oleate, 2.5 gm quaternary di-methyl sulfate salt of amino 12 poly hydroxy stearate di-methyl sulfate salt, 3.5 gm of poly ethylene oxide (POE) 5 moles of Sorbitan mono stearate. The monomer phase was added to oil phase in 30 minutes under high speed stirring to produce a stable dispersion and then subjected to polymerization using 0.3 gm of Azobis isobutyronitrite and t-butyl hydroperoxide redox with sodium meta-bi-sulfite at 50-70° C. for 2 hrs.

The product was then filtered to remove coagulum of 0.8 gm and used further.

Example 5

These mixes were mixed by hand. The aggregate and mixing vessels were preheated in an oven at approximately 10° C. higher than desired/recorded temperature to account for cooling during mixing at room temperature. The bitumen was also heated to desired mixing temperature. In a few experiments, additives were pre-added to bitumen binder like 42% solution of di-methoxy, hydroxy ethoxy propyl silyl octa-decyl ammonium chloride (Zycosoil commercially available from Zydex Industries) or amine like di-methyl octa-decyl amine as anti-stripping agent. Lime was added as 10% solution on aggregate and allowed to marinate for 24 hrs at room temperature in few experiments. The water soluble/swellable microgels dispersion was added to the hot bitumen binder and mixed. After mixing, it was weighed immediately on the hot aggregate and then it was manually mixed. This mixing with microgels dispersion and weighing step was always achieved in 30-35 sec. The wetting time, coating time, mixing time, and ease of mixing were noted for the mix preparation and rated.

Basalt aggregates with gradation suitable for binder course was chosen. Standard aggregate and stone powder mix for these experiments with following composition—20 mm passing 40%, 10 mm passing 30%, 6 mm passing 30% was used for preparation. 4.5% binder was used in formulation on weight of mix. The liquid anti-strip additive was added on the weight of binder prior to microgels dispersion addition.

TABLE 1

Summary of experiments
Basalt aggregate
Bitumen 60-70 Grade

| S. No. | Bitumen % on wt of Aggregate | Anti-stripping agent on the weight of Bitumen | Mixing Temp (° C.) | Wetting time to achieve 70-80% coating (sec) | Coating time to achieve 95-98% coating (sec) | Mixing Time to achieve 100% coating (sec) | Ease of Mixing Scale 1-5 * |
|---|---|---|---|---|---|---|---|
| 1 | 4.5 | Control (No additive) | 135 | 48-50 | 110-115 | 120 | 3-4 |
| 2 | 4.5 | 1% Hydrated.Lime marinated on aggregates | 135 | 72-74 | 180-200 | 240 | 5 |
| 3 | 4.5 | 0.5% Amine | 135 | 59-60 | 105-110 | 120 | 4 |
| 4 | 4.5 | 0.1% Zycosoil | 135 | 50-55 | 95-100 | 110 | 3 |
| 5 | 4.5 | 0.5% Example-1 | 120 | 32-35 | 90-95 | 100 | 2 |
| 6 | 4.5 | 0.1% Zycosoil + 0.5% Example-1 | 120 | 28-30 | 60-70 | 90 | 1-2 |
| 7 | 4.5 | 0.5% Amine + 0.5% Example-2. | 120 | 43-45 | 90-95 | 110 | 2 |
| 8 | 4.5 | 0.5% Example-2 | 120 | 28-32 | 85-90 | 100 | 2 |
| 9 | 4.5 | 0.1% Zycosoil + 0.5% Example-2 | 120 | 24-26 | 60-70 | 90 | 1-2 |
| 10 | 4.5 | 1% Hydrated lime marinated On aggregate + 0.5% Example-2 | 120 | 40-45 | 100-120 | 180 | 2-3 |
| 11 | 4.5 | Control (No additive) | 120 | 75-80 | 170-180 | 210 | 5 |
| 12 | 4.5 | 0.5% Example-4 | 120 | 35-38 | 90-95 | 110 | 2 |

* 1 → very easy mixing
5 → difficult to mix

Table-1 summarizes the ease of mixing by observing wetting time, coating time & final mixing time with ease of mixing. As referenced in Table 1 and throughout, Zycosoil is commercially available from Zydex Industries (Gujarat, India).

The control S.No. 1 & 11 at high & lower temperature shows substantial difficulty at lower temperature for all parameters. Addition of water soluble/swellable microgels according to embodiments of the present invention exhibit substantial reduction in wetting time, coating time and ease of mixing at lower temperatures.

Example 6

The asphalt grade (penetration) 60-70 was used. Example-2 was mixed at 135° C. and stirred for 20 minutes. The mix was then cooled down to 25° C. and the penetration number was measure in mm.

TABLE II

Penetration No.
Ref Code: IS - 73, 2001 Method was used to measure
penetration number the penetration range is 60-70 mm.

| S. No. | Grade of Asphalt | Sample Identification | Zycosoil (%) | Example-2 (%) | Penetration In (mm) |
|---|---|---|---|---|---|
| 1 | 60-70 | S1 | — | — | 68 |
| 2 | 60-70 | S2 | 0.1 | — | 67 |
| 3 | 60-70 | S3 | — | 0.3 | 65 |
| 4 | 60-70 | S4 | — | 0.5 | 64 |
| 5 | 60-70 | S5 | — | 1 | 62 |
| 6 | 60-70 | S6 | — | 2 | 60 |
| 7 | 60-70 | S7 | 0.1 | 0.5 | 64 |

As shown in Table II, addition of water soluble/swellable microgels (e.g., microgels in oil dispersion according to embodiments of the present invention) into hot asphalt binder beneficially provides a reduction in the value of penetration. The recognizable reduction is one desirable property to improve rut resistance and final strength of the pavement.

Example 7

Aggregate bitumen compositions were mixed by following procedure in example-5. The molds were prepared using 75 blows on both sides. The mixing and compaction temperature and 2 hr conditioning time were maintained identical for a given mix.

TABLE 3

Marshall Stability & Flow Value ASTM D-1075 Method

| S. No. | Bitumen % on wt of Aggregate | Anti-stripping agent on the wt of Bitumen | Mixing & Compaction Temp ° C. | R. Temp. unconditioned Sample Stability Kg | Flow mm | 60° C. water conditioning 24 hr immediate breaking Stability Kg | Flow mm | 60° C. water conditioning 24 hr & 2 hr R. Temp. conditioning Stability Kg | Flow mm |
|---|---|---|---|---|---|---|---|---|---|
| 1 | 5.1% | Control (No additive) | 135 | 1577.0 | 2.80 | 1266.0 | 3.70 | 1395.0 | 3.40 |
| 2 | 5.1% | 1% Hydrated.Lime marinated on aggregates | 135 | 1621.0 | 2.50 | 1301.0 | 4.30 | 1415.0 | 3.90 |
| 3 | 5.1% | 0.5% Amine | 135 | 1410.0 | 2.90 | 1022.0 | 4.20 | 1117.0 | 3.80 |
| 4 | 5.1% | 0.1% Zycosoil | 135 | 1825.0 | 2.95 | 1480.0 | 3.80 | 1633.0 | 3.50 |
| 5 | 5.1% | 0.5% Example-1 | 120 | 2065.0 | 2.60 | 1855.0 | 4.10 | 1910.0 | 3.50 |
| 6 | 5.1% | 0.1% Zycosoil + 0.5% Example-1 | 120 | 2801.0 | 2.05 | 2116.0 | 3.85 | 2265.0 | 3.15 |
| 7 | 5.1% | 0.5% Amine + 0.5% Example-2 | 120 | 2270.0 | 2.80 | 1680.0 | 3.70 | 1935.0 | 3.50 |
| 8 | 5.1% | 0.5% Example-2 | 120 | 1955.0 | 3.20 | 1620.0 | 4.10 | 1777.0 | 3.80 |
| 9 | 5.1% | 0.5% Example-2 + 0.1% Zycosoil | 120 | 2820.0 | 2.60 | 2175.0 | 3.50 | 2340.0 | 3.20 |
| 10 | 5.1% | 1% Hydrated lime marinated On aggregate + 0.5% Example-2 | 120 | 1430.0 | 2.70 | 1018.0 | 3.60 | 1285.0 | 3.10 |

Addition of water soluble/swellable microgels (e.g., microgels in oil dispersion according to embodiments of the present invention) has shown to provide substantial improvement in stability over the control with amine or silane additive and to a small extent with lime. The addition has shown similar flow value at high stability indicating stronger composition maintaining.

Example 8

The compositions were prepared as described in Example-5. The samples after conditioning were subjected to a 10 minute boil test as per ASTM-D-3625 and the samples were further tested to 1 hr and 6 hr boil test. Percent coating of bitumen on aggregate was recorded.

TABLE 4

Boil Test ASTM - D - 3625
Bitumen 60-70 Grade used

| S. No. | Bitumen % on wt of Aggregate | Anti-stripping agent on the weight of Bitumen | Mixing Temp ° C. | Conditioning Time | Conditioning Temp ° C. | % coated aggregates Boiling Deionized water 10 min | 1 hr | 6 hr | % coated aggregate boiling 4% NaCl water 10 min | 1 hr | 6 hr |
|---|---|---|---|---|---|---|---|---|---|---|---|
| 1 | 4.5 | Control (No additive) | 135 | 2 hrs | 135 | 80 | 40 | 10 | 59 | 10 | 5 |
| 2 | 4.5 | Hydrated.Lime 1% marinated on aggregates | 135 | 2 hrs | 135 | 95 | 65 | 30 | 65 | 25 | 10 |
| 3 | 4.5 | 0.5% Amine | 135 | 2 hrs | 135 | 90 | 55 | 20 | 60 | 15 | 5 |
| 4 | 4.5 | 0.1% Zycosoil | 135 | 2 hrs | 135 | 100 | 95 | 95 | 75 | 55 | 25 |
| 5 | 4.5 | 0.5% Example-1 | 120 | 2 hrs | 120 | 95 | 85 | 70 | 65 | 35 | 15 |
| 6 | 4.5 | Zycosoil 0.1% + 0.5% Example-1 | 120 | 2 hrs | 120 | 100 | 98 | 95 | 95 | 95 | 80 |
| 7 | 4.5 | 0.5% Amine + 0.5% Example-2 | 120 | 2 hrs | 120 | 95 | 80 | 60 | 80 | 60 | 20 |
| 8 | 4.5 | 0.5% Example-2 | 120 | 2 hrs | 120 | 95 | 80 | 65 | 65 | 45 | 25 |
| 9 | 4.5 | 0.5% Example-2 + 0.1% Zycosoil | 120 | 2 hrs | 120 | 100 | 98 | 95 | 95 | 95 | 85 |
| 10 | 4.5 | 1% Hydrated lime marinated On aggregate + 0.5% Example-2 | 120 | 2 hrs | 120 | 95 | 75 | 35 | 75 | 35 | 15 |
| 11 | 4.5 | Control (No additive) | 120 | 2 hr | 120 | 45 | 10 | 5 | 15 | 5 | 2 |
| 12 | 4.5 | 0.5% Example-4 | 120 | 2 hr | 120 | 95 | 85 | 70 | 65 | 40 | 20 |

Table-4 shows clearly that lowering temperature does affect the moisture sensitivity as seen in Example 1 & 11. Addition of water soluble/swellable microgels (e.g., microgels in oil dispersion according to embodiments of the present invention) to asphalt has shown substantial improvement against stripping in boiling DM water as well as in 4% salt (NaCl) water.

That which is claimed:

1. An asphalt composition comprising:
bitumen;
aggregate; and
a dispersion comprising microgels dispersed in an oil, said microgels comprising at least one water swollen/swellable polymer, water soluble polymer, or combination thereof; wherein said water swollen/swellable polymer or said water soluble polymer comprises a reverse phase polymerization reaction product of an aqueous monomer phase comprising at least one ethylenically unsaturated amide with a solvent oil and an emulsifier.

2. The composition as claimed in claim 1, wherein the composition comprises
(i) from 80% wt to 98% wt of the aggregate on the weight of said composition;
(ii) from 2% wt to 20% wt of bitumen on the weight of said composition; and
(iii) from 0.01% wt to 5% wt of the microgels on the weight of bitumen.

3. The composition as claimed in any of the claim 1 or 2, wherein the bitumen comprises from 0.01% wt to 20% wt of modifiers on the weight of the bitumen.

4. The composition as claimed in claim 3, wherein said modifier is selected from natural rubber, synthetic rubber, polymer, waxes, anti-stripping agent, emulsifier, and combinations thereof.

5. The composition as claimed in claim 4, wherein the modifier is a polymer selected from a plastomer, a thermoplastic resin, a thermosetting resin, an elastomer and combinations thereof.

6. The composition in any of the claim 1 or 2, wherein the bitumen comprises from 0.01% wt to 50% wt of extenders selected from sulfur in powder form or sulfur in prill form.

7. The composition as claimed in any of the claim 1 or 2, wherein the bitumen is selected from naturally occurring bitumen, naturally occurring bituminous materials, bitumen from crude oil, bitumen from petroleum pitches, bitumen from coal tar, and combinations thereof.

8. The composition as claimed in any of the claim 1 or 2, wherein the bitumen is selected from polymer-modified bitumen, rubberized bitumen, acid modified bitumen, wax modified bitumen, and combinations thereof.

9. The composition as claimed in claim 8, wherein the polymer-modified bitumen is at least one member selected from the group consisting of styrene-butadiene-styrene, styrene-butadiene rubber polyisoprene, polybutylenes, butadiene-styrene rubbers, vinyl polymers or ethylene vinyl acetate copolymer.

10. The composition as claimed in any of the claim 1 or 2, wherein the bitumen is modified with recycled crumb rubber from recycled tires, sulfur containing crosslinkers, acid modifiers, or combinations thereof.

11. The composition as claimed in claim 4, wherein said anti-stripping agent is selected from an amine, a quaternary compound or a silane.

12. The composition as claimed in claim 4, wherein said anti-stripping agent is present from 0.01% wt to 5% wt on the weight of the bitumen.

13. The composition as claimed in any of the claim 1 or 2, further comprising an additive selected from waxes, anti-stripping agent, emulsifier, hydrated lime, crumb rubber from recycled tires, and combinations thereof.

14. The composition as claimed in claim 13, wherein the additive is hydrated lime and is present from 0.1 to 5% wt. on weight of said composition.

15. The composition as claimed in any of the claim 1 or 2, wherein said aggregate is selected from dense graded aggregate, gap graded aggregate, open graded, stone matrix aggregate, reclaimed asphalt pavement aggregate, reclaimed roofing shingles and combinations thereof.

16. The composition as claimed in any of the claim 1 or 2, wherein the microgels further comprise a water content from 5% to 98% by weight on the weight of the microgels.

17. The composition as claimed in any of the claim 1 or 2, wherein said microgels have a particle size from 0.01 microns to 100 microns.

18. The composition as claimed in claim 17, wherein said solvent oil is present from 5% to 80% by weight of the dispersion.

19. The composition as claimed in claim 17, wherein said aqueous monomer phase is present from 95% to 20% by weight of the dispersion.

20. The composition as claimed in claim 17, wherein said aqueous monomer phase is independently selected from an anionic, a cationic, a non-ionic or an amphoteric monomer.

21. The composition as claimed in claim 17, wherein the composition includes a water soluble monomer, said water soluble monomer having a water solubility of at least 5%.

22. The composition as claimed in claim 17, wherein said aqueous monomer phase includes a multifunctional monomer capable of forming a cross-linked water swollen or water swellable microgels.

23. The composition as claimed in claim 17, wherein said emulsifier is a combination of an emulsifier and a vinyl functional oil soluble monomer.

24. The composition as claimed in claim 23, wherein said vinyl functional oil soluble monomer has a water solubility of less than 1%.

25. The composition as claimed in any of the claim 1 or 2, wherein said microgels dispersed in oil comprises an aqueous solution or swollen polymer emulsified with a solvent oil and an emulsifying agent.

26. The composition as claimed in any of the claim 25, further comprising a reaction additive to impart cross-linking or chain extensions to promote formation of a cross-linked microgels dispersion in oil.

27. The composition as claimed in any of the claim 1 or 2, further comprising at least one cationic organosilicon compound selected from the group consisting of:

$$Y_{3-a}Si(R^1_a)R^2N^+R^3R^4R^5X^-,$$

$$Y_{3-a}Si(R^1_a)R^2P^+R^3R^4R^5X,$$

$$Y_{3-a}—Si(R^1_a)R^2ZX^-; \text{ and mixtures thereof,}$$

wherein in each formula
Y is independently selected from a group consisting of OR, $O(CH_2CH_2O)_nH$, $(CH_3OCH_2CH_2O)$, and $(CH_3CH_2OCH_2CH_2O)$;
a has a value selected from 0, 1 or 2;
n is a value from 1 to 10;
R is a C1-C4 alkyl;
$R^1$ is either methyl or ethyl;
$R^2$ is a C1-C4 alkylene group;

$R^3$, $R^4$ and $R^5$ are each independently selected from a group consisting of C1-C22 alkyl wherein at least one such group has more than 8 C-atoms, —$CH_2C_6H_5$, —$CH_2CH_2OH$, $CH_2OH$ and —$(CH_2)_yNHC(O)R^6$ wherein y has a value of from 2 to 10 and $R^6$ is a C1-C12 perfluoroalkyl radical;

X is chloride, bromide, fluoride, iodide, acetate or tosylate; and

Z is pyridinium ring of formula $C_5H_5N^+$.

28. The composition as claimed in claim 1, further comprising at least one crosslinking agent.

29. The composition as claimed in claim 1, wherein the at least one ethylenically unsaturated amide comprises an acrylamide.

30. The composition as claimed in claim 29, wherein said microgels have a particle size from 0.01 microns to 100 microns.

* * * * *

UNITED STATES PATENT AND TRADEMARK OFFICE
CERTIFICATE OF CORRECTION

Page 1 of 1

PATENT NO. : 8,859,649 B2
APPLICATION NO. : 12/969008
DATED : October 14, 2014
INVENTOR(S) : Ajay Ranka It is certified that error appears in the above-identified patent and that said Letters Patent is hereby corrected as shown below:

On the Title Page, Item (54) and in the Specification, Col. 1, lines 1-3 "ASPHALT COMPOSITIONS INCLUDING A DISPERION OF MICROGELS DIPERSED IN AN OIL" should read -- ASPHALT COMPOSITIONS INCLUDING A DISPERSION OF MICROGELS DISPERSED IN AN OIL --.

In the Claims

Col. 18, Claim 27, line 57 "Y3-a—Si(R1a)R2ZX$^-$; and mixtures thereof," should read -- Y3-aSi(R1a)R2ZX$^-$; and mixtures thereof, --.

Col. 19, Claim 27, line 4 "—CH2CH2OH, CH2OH and —(CH2)yNHC(O)R6" should read -- —CH2CH2OH, —CH2OH and —(CH2)yNHC(O)R6 --.

Signed and Sealed this
Second Day of June, 2015

Michelle K. Lee
*Director of the United States Patent and Trademark Office*